United States Patent Office 3,159,626
Patented Dec. 1, 1964

3,159,626
TRIETHYLENE-DIAMINE ALANE AND A PROCESS FOR ITS PREPARATION
Eugene C. Ashby, Baton Rouge, La., assignor to Ethyl Corporation, New York, N.Y., a corporation of Virginia
No Drawing. Filed Feb. 27, 1963, Ser. No. 261,515
3 Claims. (Cl. 260—242)

This invention relates to a new composition of the alane type, and a new and novel process for manufacturing said composition.

Alane compounds, alane herein being used to designate the aluminum trihydride, $AlH_3$, grouping, are known in the art. Such compounds include aluminum trihydride or alane alone, and complexes containing this group or moiety with basic nitrogenous materials, and also the complex metal hydrides such as lithium aluminum hydride, $LiAlH_4$. In general, the techniques for making these materials have been relatively complicated, involving, in effect, the separate generation of alane itself and then the complexation of it with another material. For example, one method of making alane involves the reaction of aluminum trichloride, $AlCl_3$, with sodium hydride, which, in the appropriate proportions, will produce alane. Further reaction of the alane so-formed will provide the bimetallic complex hydride, sodium aluminum hydride. (See U.S. Patent 2,567,972.)

It has previously been discovered and disclosed that alkali aluminum metal hydrides can be made by the direct reaction of the two metals involved, an alkali metal and aluminum, with hydrogen, under elevated pressure conditions and in the presence of a reaction medium. (See French Patent 1,235,680.)

I have now discovered a new alane composition containing only one metal, viz., the aluminum of the alane grouping, and a process for making said composition.

The object of the present invention, then, is to provide a new composition, which is a highly stable alane and contains only one metallic element. An additional object is to provide an effective and straightforward process for making said new composition.

The new product of the present invention is a stable solid complex, triethylene diamine alane having a composition empirically expressed as

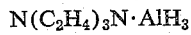

$$N(C_2H_4)_3N \cdot AlH_3$$

The material is a crystalline, gray colored solid, which is insoluble in hydrocarbons, ethers, and other non-aqueous relatively inert solvents. The material is thermally stable up to relatively elevated temperatures of over 200° C., and can be stored for relatively long periods of time without decomposition, in dry air. The product of the invention is, however, quite reactive with water and is a strong reducing agent for reducible organic compounds. Upon reaction with water, hydrogen is evolved corresponding in quantity to the three atoms of hydrogen per molecule of the product.

The process of the invention involves the pressure hydrogenation of a system including triethylene diamine dissolved in a non-reactive solvent or reaction medium, and subdivided or high surface aluminum metal, preferably aluminum metal which has been previously activated. The process is carried out with agitation of this system, and the operating pressure can be virtually any pressure substantially above atmospheric. As a practical matter, it is found that pressures of 1,000 to about 15,000 pounds per square inch are preferred, a more preferred range being from about 4,000 to 7,000 pounds per square inch operating pressure. Because of the heterogeneous character of the reaction system, positive agitation is highly desirable to provide continued efficient contact between the several reactants.

As stated, the process is carried out with a reaction medium which is a solvent for the triethylene diamine and which is non-reactive at the operating conditions. Suitable solvents are aromatic hydrocarbons, straight and branched chain aliphatic hydrocarbons, tetra hydrofuran and alkyl substituted tetrahydrofurans, the dialkyl ethers of ethylene glycol and polyglycols, and trialkyl amines. The triethylene diamine is usually dissolved in a concentration of about 10 to 50 weight percent of the reaction medium.

Catalysts are frequently employed in the synthesis, but are not essential. Catalysts are less important when the solvent has a basic or coordinating character, as in the case of triethyl amine, tri-n-butyl amine, or the liquid dialkyl ethers of the polyglycols. Catalysts are more desirable when the reaction medium is an inert hydrocarbon such as benzene or toluene.

The catalysts used are hydrocarbon aluminum compounds, i.e., aluminum compounds having at least one carbon-aluminum linkage, of which the trialkyl aluminum compounds are the most representative class. Typical catalyst highly suitable for the process are triethyl aluminum, diethyl aluminum hydride, triisobutyl aluminum, tri-n-hexyl aluminum, tri-n-propyl aluminum, and others known in the art. Alkyl aluminum compounds having halogen substituents, such as diethyl aluminum chloride, or the mixture of alkyl aluminum chloride referred to as the sesquichloride, such as ethyl aluminum sesquichloride, are generally avoided, because the presence of a halogen substituent tends to result in a partial loss by reaction of the triethylene diamine reactant. Catalysts, when used, are present in very low and catalytic concentrations of, typically, about 0.1 to 5 weight percent of the aluminum, most frequently about 1 to 2 weight percent.

The proportions of the reactants are not critical but are important. The triethylene diamine can be used in proportions of less than one mole per atom of aluminum. In such cases, the solid product will be contaminated with a corresponding amount of unreacted subdivided aluminum. When at least one mole, and preferably 1.1 to 5 moles of the triethylene diamine are used per atom of aluminum, the purity of the solid product is greatly enhanced. The preferred range of proportions is then from at least one up to about 5 moles per atom of aluminum.

The processing is, as indicated, carried out at temperatures below 200° C. and at at least about 25° C. A preferred temperature range is 50 to 100° C., an even more highly preferred temperature range being 60 to 90° C. At lower temperatures, reaction occurs at lower rates, whereas the preferred temperature facilitates good rate and high yields.

The time of reaction required for a good conversion depends on the temperature, pressure, degree of subdivision of the aluminum reactant, and the efficiency of agitation. The effect of said operating variables will become readily apparent to those skilled in the art by simple adjustment. In typical operations, contacting times from 1 to 100 hours per batch are representative reaction cycles of 20–60 hours being preferred. With higher temperatures, higher pressures, increased subdivision of the aluminum reactant, lower contacting or reaction times in the indicated range are entirely possible.

The examples below show the typical preparations of the product and workup of the results of an operation of the process.

*Example 1*

Triethylene diamine as obtained from the supplier, was purified by dissolving in benzene and carrying out an azeotropic distillation to assure that a dry solvent was obtained.

After the above azeotropic distillation drying operation, the liquid phase was subjected to vacuum distillation at about 10 mm. mercury pressure until the benzene had been substantially all distilled, as demonstrated by the appearance of the triethylene diamine in its normally solid form.

A solution of the triethylene diamine in tetrahydrofuran at a concentration of about 23 weight percent was then made. To this was added highly subdivided aluminum in proportions of about one-fifth of the weight of the triethylene diamine in solution, this providing, then, proportions of about 4.6 moles triethylene diamine per gram atom of aluminum.

This aluminum had been previously activated according to the method of Redman as described in Patent 2,885,314. The aluminum, following the activation, was washed with hexane by slurrying, and the excess was decanted from the aluminum.

The reaction system thus formed was provided in a Magne Dash reactor, provided with a hydrogen feed line and an internal agitation device. The reactor and contents were heated to about 70° C. and then pressurized at 5,000 pounds per square inch hydrogen pressure. These conditions were maintained for 60 hours, during which time sufficient pressure drop occurred to show appreciable reaction, although the relative amount of vapor space was such that the actual pressure drop was relatively small.

The reactor and contents were cooled to ambient temperature, the excess hydrogen pressure was vented off, and the contents were filtered, isolating a light gray solid, finely divided product material.

Portions of the solid product were analyzed as follows: The sample was hydrolyzed first with isopropyl alcohol, and then with water, resulting in release of hydrogen gas and formation of aluminum trihydroxide, $Al(OH)_3$, which was removed from the mixture by filtration. A potentiometric titration of the balance was made with aqueous hydrogen chloride. A blank determination of potentiometric end point, using triethylene amine in tetrahydrofruan, had been previously made to establish sharpness of end point. Analytical results by the foregoing procedure showed the following composition, which is compared with the theoretical composition below:

| Component | Found | Theoretical $N(C_2H_4)_3N \cdot AlH_3$ |
| --- | --- | --- |
| Nitrogen _____ weight percent__ | 19.2, 19.1 | 19.7 |
| Aluminum _____ do____ | 21.8 | 19.0 |
| Hydrogen _____ millimoles/g__ | 22.4 | 21.2 |

Conversion of 94 percent of the aluminum was obtained. In addition to the foregoing gas evolution and potentiometric analysis, a separate determination of the amount of nitrogen in another portion of the solid product was made by the Kjeldahl method, and showed a nitrogen content of 19.1 weight percent, providing very good confirmation.

The foregoing analysis showed that the product represented a very high concentration of the material having the empirical formula already given, $N(C_2H_4)_3N \cdot AlH_3$, which is termed triethylene diamine alane. A molecular weight determination was not made, as the product is insoluble in most common organic solvents, such as diethyl ether, tetrahydrofuran, benzene, and the dimethyl ether of diethylene glycol. The product was found to be stable upon heating, in a dry atmosphere, up to over 200° C. However, when portions were dropped into water, violent reaction occurred, being the release of hydrogen gas upon hydrolysis.

To illustrate further other modes of carrying out the invention, the examples tabulated below show the variations in procedure which are feasible.

| Example | Reaction medium | Charge ratio [1] | Concentration of $N(C_2H_4)_3N$, Wt. Percent of Reaction Medium | Reaction Conditions Pressure, p.s.i. | Reaction Conditions Temp., ° C. | Reaction time, hr. | Catalyst if any |
| --- | --- | --- | --- | --- | --- | --- | --- |
| 2 | Benzene | 2 | 20 | 5,000 | 100 | 50 | $(C_2H_5)_2AlH$ |
| 3 | Tetrahydrofuran | 1.2 | 10 | 5,000 | 70 | 60 | $(C_2H_5)_3Al$ |
| 4 | Triethyl amine | 4 | 40 | 10,000 | 60 | 80 | $(nC_4H_{15})_3Al$ |
| 5 | Tetrahydrofuran | 4 | 40 | 2,000 | 120 | 60 | $(C_2H_5)_2AlH$-$(C_2H_5)_3Al$ mixt. |
| 6 | Dimethoxyethane | 1 | 10 | 7,000 | 90 | 15 | |
| 7 | Dimethyl ether of diethylene glycol. | 2 | 20 | 15,000 | 40 | 10 | |

[1] Moles triethylene diamine:atom of aluminum.

The product of the present invention provides a convenient, heat stable material which can be employed readily for gaseous hydrogen generation at will, by addition of water. In addition, the product can be used for reductive hydrogenation organic materials, and for providing gas voids during polymerization processes. In the latter case, the trialkyllead diamine segment of the compound also enhances the oxidation stability of the resultant polymer.

I claim:

1. As a new composition, triethylene diamine alane.

2. The process of forming triethylene diamine alane comprising reacting subdivided aluminum metal and triethylene diamine, dissolved in an inert liquid medium in proportions of about 10 to 50 weight percent of the liquid medium, with hydrogen at a pressure of about 1,000 to 15,000 pounds per square inch and at a temperature of about 25 to 200° C.

3. The process of forming triethylene diamine alane comprising reacting triethylene diamine in solution in an inert liquid reaction medium selected from the class consisting of hydrocarbons, tetrahydrofuran, alkyl substituted tetrahydrofurans, trialkyl amines, dialkyl ethers of ethylene glycol and dialkyl ethers of polyethylene glycols, the triethylene diamine being in proportions of about 10 to 50 weight percent of the liquid medium, and subdivided aluminum metal, the triethylene diamine being in proportions of about 1 to 5 moles per atom of aluminum, with hydrogen and in the presence of a catalytic quantity of a hydrocarbon aluminum compound, the reaction being at a pressure of from about 1,000 to 15,000 pounds per square inch and at a temperature of about 50 to 100° C.

References Cited in the file of this patent

Nikolaev: Zhur. Fiz. Khim., vol. 28, pp. 275–281 (1954).